United States Patent
Griffin

(10) Patent No.: US 11,410,090 B1
(45) Date of Patent: Aug. 9, 2022

(54) SYSTEMS, DEVICES, SOFTWARE, AND METHODS FOR MANAGING LIVE EVENTS

(71) Applicant: Crank Media Intelligence, LLC, Boca Raton, FL (US)

(72) Inventor: Barry Griffin, Boca Raton, FL (US)

(73) Assignee: Crank Media Intelligence, LLC, Boca Raton, FL (US)

( * ) Notice: Subject to any disclaimer, the term of this patent is extended or adjusted under 35 U.S.C. 154(b) by 591 days.

(21) Appl. No.: 16/189,048

(22) Filed: Nov. 13, 2018

Related U.S. Application Data

(60) Provisional application No. 62/585,296, filed on Nov. 13, 2017.

(51) Int. Cl.
| | |
|---|---|
| G06F 3/048 | (2013.01) |
| G06Q 10/02 | (2012.01) |
| G01C 21/36 | (2006.01) |
| G06F 3/0486 | (2013.01) |
| G06F 3/04817 | (2022.01) |
| G06Q 10/10 | (2012.01) |

(52) U.S. Cl.
CPC ........... *G06Q 10/02* (2013.01); *G01C 21/367* (2013.01); *G06F 3/0486* (2013.01); *G06F 3/04817* (2013.01); *G06Q 10/1093* (2013.01)

(58) Field of Classification Search
None
See application file for complete search history.

(56) References Cited

U.S. PATENT DOCUMENTS

| | | | | |
|---|---|---|---|---|
| 2009/0326992 | A1* | 12/2009 | Junkin | G06Q 30/0253 705/5 |
| 2013/0073324 | A1* | 3/2013 | Liu | G06Q 10/02 705/5 |
| 2015/0112738 | A1* | 4/2015 | Marinaro | G06Q 10/02 705/5 |
| 2017/0161647 | A1* | 6/2017 | Platillero | G06Q 10/02 |

OTHER PUBLICATIONS

Apr. 26, 2016 Fixing The Broken Backend of Music Touring—By EventTechBrief, http://www.eventtechbrief.com/top-stories/fixing-the-broken-backend-of-music-touring.

* cited by examiner

*Primary Examiner* — William C Trapanese
(74) *Attorney, Agent, or Firm* — Nemphos Braue LLC; Michael Antone

(57) ABSTRACT

Systems, devices, software, and methods of the present invention enable stakeholders in the live event industry to coordinate activities to enable more efficient and effective staging of single live events and live event tours. The system provides a management platform that serves the communication and data needs of the entire industry ecosystem by aggregating a multitude of data streams and stakeholders to enable collaborative live event planning, booking, promoting, and executing in ways never before possible.

20 Claims, 9 Drawing Sheets

--- define an entity representing data associated with a live event;

retrieve from a database stakeholders associated with the live event;

display the stakeholders to the user select the stakeholders to receive the entity;

associate the entity with the selected stakeholders;

offer the entity to the selected stakeholder with conditions for acceptance of the entity provide the data to only those stakeholders that meet the conditions for acceptance.

SYSTEMS, DEVICES, SOFTWARE, AND METHODS FOR MANAGING LIVE EVENTS

CROSS-REFERENCE TO RELATED APPLICATIONS

This non-provisional patent application claims the benefit of and priority to U.S. Provisional Patent Application No. 62/585,296 filed Nov. 13, 2017, which is incorporated herein by reference in its entirety.

BACKGROUND OF THE INVENTION

Field of the Invention

The present invention relates in general to entertainment and live events and more specifically to systems, devices, software, and methods for choreographing interactions between relevant stakeholders in the entertainment and live event industries, such as music concerts, etc. to enable efficient live event scheduling, promotion, and performance.

Background Art

The live event industry, and, in particular, the live music event ("concert") industry requires extensive interplay between several stakeholders in order to successfully stage a live event. Performers, venue owners, agents, promoters, radio stations and other digital content providers, recording companies, advertisers, merchandisers, ticket agencies, etc., all have a stake in the success of a live event, but their interests do not fully overlap. For example, an unsuccessful multi-city music concert tour can send an artist into bankruptcy, but one lightly attended show at a venue owner's facility may not significantly impact the financial performance of the facility. As such, while the success of the various stakeholders in the live event industry are interdependent, each operates in a generally independent manner.

The inventor has proposed automating the interrelations of the various industries involved with live events, see for example, http://www.eventtechbrief.com/top-stories/fixing-the-broken-backend-of-music-touring, dated 2016 Apr. 26. While the inefficiencies of the live event industry are well known and such proposals have been generally well received, the industry continues to operate in its traditional independent, i.e., stovepiped, manner.

The inefficiencies of traditional live event operations is believed to be a significant contributor to lost revenue due to unsold event tickets. As such, there is a continuing need for improved systems, devices, and methods for interactions between relevant stakeholders in the entertainment and live event industries to enable a more efficient use of resources and capturing of revenue in the live event industry.

BRIEF SUMMARY OF THE INVENTION

Accordingly, systems, devices, software, and methods of the present invention enable stakeholders in the live event industry to coordinate activities to enable new, more efficient and effective staging of single live events and live event tours. The system provides a management platform that serves the communication and data needs of the entire industry ecosystem by aggregating a multitude of data streams and stakeholders to enable collaborative live event planning, booking, promoting, and executing in new ways not previously possible.

The system delivers industry knowledge and live event information to users in new ways through various interactive graphical and textual interfaces, such as multi-layered maps and tables to enable users to easily drill into regions and events as desired.

The system enables digital promotion planning and execution that may be targeted toward an entire tour or specific local markets. The promotions may be incrementally proliferated over time by different sources, i.e. record labels, managers and promoters, etc. on an as needed or desired basis.

The system interface allows each stakeholder to communicate with other stakeholders in various markets by linking them individually to shows, much like a social network, to enable collaboration in one place and in real-time. For example, the system may allow promoters to distribute ticket giveaways, set up local and remote interviews, etc. with an individual channel or groups of channels with the collaboration of other stakeholders; manager, agents, label, etc.

Promotions and other aspects or data associated with live events may be established as entities in the system with attributes including venue and service contracts, promotional materials, etc. For example, promotions may be delivered to various stakeholder in the system by dragging and dropping a promotional entity, i.e., icon, onto the recipient's icon, by linking promotions to other stakeholders, etc. A manager may instantly view privately and exclusively how show promotions have been allocated to, and by, their artists at each station in every market.

The system may also provide interfaces to various document management systems, such as Google docs (industry standard) or other program, enabling sharing and collaboration. This will make is possible for promoters, managers, and venues alike to collaborate on and share information, such as venue layouts, stage set ups, show schedules and the like, which may eliminate or reduce the need for walk-throughs and such trivial logistical matters.

In operation, the system aggregates industry knowledge from the various stakeholders in the live event industry and puts the data in actionable form for the various stakeholders. The user may navigate the system in various ways, such as by stakeholder searches, interfacing with a map (point and click, touch), or general queries (country music concerts in June). A user may be able to drill into specific events down to an authorization, or access, level for the user based on permissions established by the user that created or is overseeing the live event. Event icons may aggregate data related to that event, such that accessing the icon will expose various types of event data to the user depending upon the user's access credentials. For example, it may be public knowledge that an artist is performing at a venue, which is available to all users. However, only stakeholders involved in the performance may have authorization to view ticket sales and other non-public information. Other channels that are not involved in the promotion of a performance may be able to contact the promoter and request to be involved in the promotion.

It will be further appreciated that while music concerts may be a significant segment of the live event industry, the present invention is further applicable to other live events, such as sporting, speaking, other stage, book signing, and other live appearances, shows, etc.

As may be disclosed, taught, and/or suggested herein to the skilled artisan, the present invention addresses the continuing need for systems, devices, software, and methods that enable more efficient and effective planning and execution of live events.

BRIEF DESCRIPTION OF THE DRAWINGS

The accompanying drawings are included for the purpose of exemplary illustration of various aspects of the present invention, and not for purposes of limiting the invention, wherein.

Figure 1:
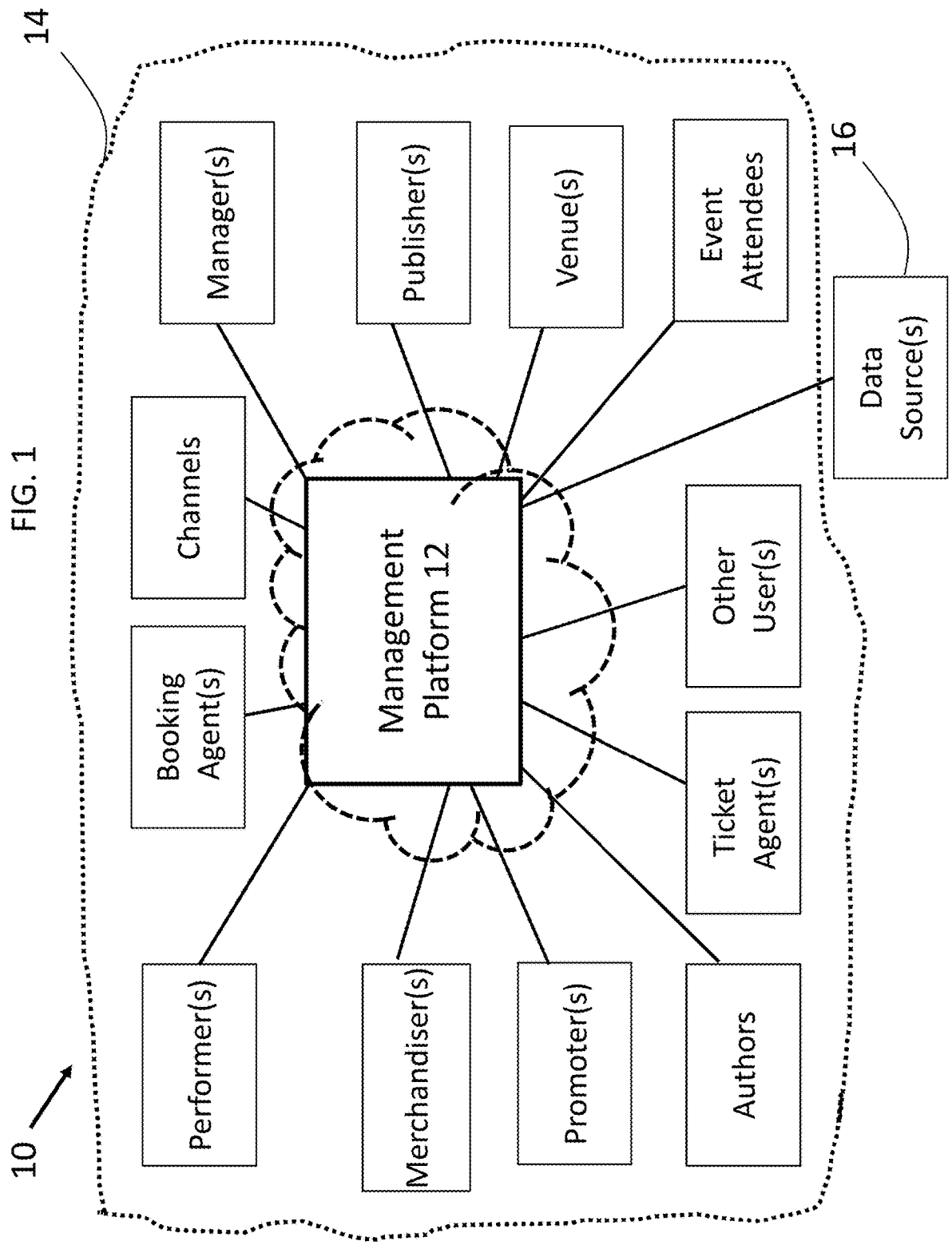
FIG. 1 illustrates an exemplary embodiment of the system.

In the drawings and detailed description, the same or similar reference numbers may identify the same or similar elements. It will be appreciated that the implementations, features, etc. described with respect to embodiments in specific figures may be implemented with respect to other embodiments in other figures, unless expressly stated, or otherwise not possible.

No claim is made to any images, names, or any other intellectual property of others that may be depicted in the drawings, and all intellectual property rights owned by others remain with the property of those others. Any use of others' intellectual property herein is meant to be only exemplary in nature to aid in describing the invention and not meant to suggest or claim any ownership in the intellectual property.

DETAILED DESCRIPTION OF THE INVENTION

Device location systems, devices, software, and methods of the present invention are described herein, by way of example and otherwise.

FIG. 1 illustrates an exemplary ecosystem of interested parties involved in live events, such as music concerts. An event management system 10 includes a management platform 12 that manages interactions between user devices 14 operated by the various users, i.e., stakeholders, interested parties, etc. involved in the live event and data provided by the various users and other sources 16. The system 10 provides a platform to allow communication and coordination across the entire industry ecosystem by aggregating a multitude of data streams and facilitating traditional and new interactions between users.

The various interested parties and stakeholders in live events may include performers, managers, booking agents, promoters, venue, merchandisers, playback channels, ticket agencies, content publishers, content sellers, authors, attendees, guests, etc. When used herein, performer(s) may include one or more individuals, groups of individuals, performance companies, authors, artists, speakers, and other persons or groups that may "perform/appear" at the live event. It may also include various surrogates (managers, agents, etc.) that perform various functions on behalf of the performers and other entities.

The system 10 may have access to various types of data, such as:

stakeholder information (performers, managers, agents, promoters, venue, merchandisers, playback channels, ticket agencies, publishers, authors, etc.)

performer information (contact information, event preferences, performance fee, contracts, etc.)

content information (name, performer, genre, publisher, author, etc.)

playback information (content, channel, date, time, etc.)

channel information ((channel type(broadcast, e.g., radio & TV stations, streaming, on-demand), content type (audio, video), market(s), market size, genre(s))

venue information (city, capacity, schedule, fees, promoters, performance restrictions, contracts, etc.)

future event information (performer, venue, date, time, total tickets, ticket sold (date, time, price, ticket broker), tickets available, deposits and other requirements, etc.)

prior event information (performer, venue, date, time, total tickets available, ticket sold, total revenue, stakeholder information, attendee information, contracts, etc.)

promoter information (contact information, events, markets, venues, genres, fees, contracts, etc.)

ticketing agency information (market(s), fees, contracts, etc.) merchandiser & service provider information (contact information, merchandise, market(s), pricing, contracts, etc.)

manager/agent information (contact information, performer clients, fee, contracts, etc.)

publisher information (contact information, contracts, etc.)

content sellers (contact information, locations, types of content, etc.)

author information (contact information, contracts, etc.)

attendee information (contact information, preferences, notification settings, etc.)

In various exemplary embodiments, a performer upon deciding to appear at one or more live events, i.e., a tour, would access the system (directly or via a manager) and identify various tour criteria, such as:

number of appearances on the tour, range of dates for the appearances, geographical area for the appearances, appearance frequency (e.g., every day, every other day, etc.), promotion frequency and types, preferences—likes and dislikes (promoter, venue, ticketing agency, cities, other performers, food, etc.)

These criteria can also be set by default and/or pursuant to a user profile, which may include defaults and preferences for some or all of the information required to plan and execute the tour. Performers may also set their availability to play various dates, locations, venues, etc. without arranging a tour, so that they may be contacted to join an event being planned.

With the tour input selections, the system 10 may provide the performer with various recommended locations, e.g., cities, for consideration based on the information contained by the system. The information used to provide the locations may be a combination of one or more sets of information accessible to the system. For example, the recommended locations may be based on one or more of the following criteria:

content playback (present and/or past);
content sales/rentals (present and/or past);
prior live event results;
genre results (e.g., genre as a function of market, e.g., music);
results from similar performers;
other performers considering similar tours (potential touring partners), etc.

In various embodiments, the performer (or manager, agent, etc.) may select the criteria to be used by the system 10 in making the recommendations or employ system defaults, machine learning technologies, etc. The recommendations may be presented to the performer in a form that enables the artist to filter or sort the recommendations using the various criteria.

The performer may review the list of cities and select the cities of interest. Upon selection, the performer may be presented with various options in terms of venues, available dates, other performers, etc. that may be saved in a profile or entered upon demand.

Upon further selection of options, the system 10 may contact the various potential stakeholders in the event, such as the venue, promoter, etc. with a proposal to schedule a live event at the venue on one or more dates with pricing and other salient terms and conditions. The contact may be internal to the system 10 and/or external, such as sending an email and/or text either with the details or a notice to check the system 10.

Event proposals provided to the various parties may enable those parties to conditionally accept the proposal, reject, or make a counter-proposal. Conditional acceptance may be required to allow the performer to ensure all of the proposed live event dates are properly coordinated. Conditional acceptance may be revocable by the accepting party or set to expire if the performer does not confirm acceptance within a period of time.

In various embodiments, the system may send the stakeholders a request for quotes/proposals (RFQ/RFP) to provide services for the live event. The RFQ may be sent directly to each of the stakeholders or to subsets of the stakeholders that may, in turn, coordinate a response with other stakeholders. For example, a RFQ might be sent to a promoter to pull together a quote with a venue, merchandiser(s), other performers, other service providers, etc., and provide a turn-key quote for the live event. The promoter, in turn, may use the system 10 to request quotes from the various stakeholders, which may be bundled and presented to the performer for acceptance, rejection, or counter-proposal. Again, the quotes may be binding, cancellable, and/or expire depending upon the party. The system 10 may track cancellations and other information that might be of interest to other stakeholders.

Once the performer (or performer's manager(s)/agent(s) and the other stakeholder(s)) agrees on a performance schedule (i.e., tour schedule), then contracts are signed and promotion of the performance dates is undertaken. The various stakeholders may be involved in the promotion of the event as it relates to them. For example, the performer may provide free tickets and/or on air appearances to various channels (radio, TV, & digital) in exchange for promoting the performance. The venue may promote various performance packages that include meet and greet arrangements with the performer, merchandise deals, etc. The publishers, e.g., record labels, may arrange special pricing, autographs sessions, etc. with content sellers (on-line and/or local brick and mortar stores). Booking agents may interact with the system to coordinate the interactions between the various stakeholders.

The various stakeholders may implement marketing/promotional triggers in the system to initiate or terminate various promotional activity or the event itself. For example, the performer, venue, and other stakeholders may agree that if ticket sales have not reached:

a first level by a first date, then the performance may be cancelled, or second, third, . . . levels by various dates, then promotional tickets will be provided to channels, etc.

Also, if ticket sales reach various levels ($1^{st}$, $2^{nd}$, $3^{rd}$, etc.) by certain dates, then the further stages of promotion begin, such as releasing reserved tickets at a higher price or open a secondary ticket exchange, where tickets can be resold with a portion of the sales price returning to the performer.

Promotional triggers in the system may be automatic and/or require action by one or more of the users of the system. For example, the system may trigger a prompt to the various stakeholders that ticket sales have not reached the target amount and require action by the stakeholders to decide to cancel the performance, change venues, increase promotion, change the trigger, or do nothing.

Performers may use playback information from the channels as a trigger to providing promotion materials to the various channels. For example, airplay information may be used to determine which channels, e.g., radio stations, are playing an artist's songs and direct promotional efforts toward those stations, since the amount of play may be indicative of channel audience interest in the performer. Conversely, a performer may want to direct additional promotional materials to various channels in an effort to increase the amount of playback from those stations.

Performers (or their surrogates) may set their personal promotional types and availability. The system 10 may notify the stakeholders of the performer availability. The system may enable the stakeholders to freely sign up for the promotional availability and/or bid on performer's promotional availability. In various embodiments, the availability may be coupled to various performance metrics, such as ticket sales by a stakeholder, playback levels, content sales, etc.

Performers may further use the system 10 to invite other performers and other guests to attend or perform with the performer at a live event, and/or be a performer at the live event. Guest and other invitees attending a live event may be provided to the venue hosting the live event as a guest list.

The various users may employ an availability calendar to provide other users with available dates and/or locations. The other users may use the availability calendar of other users to coordinate events. Each user may set access levels to viewing their availability. For example, performers may allow their manager full access, and perhaps control, of their calendar, but limit the access to some other users. Conversely, a venue may provide full access to venue dates and, perhaps, even allow temporary freezing of open dates to support tour planning.

Publishers, e.g., record labels, etc. may employ the system 10 to promote content and merchandise sales providing channels with free content downloads and other merchandise for giveways and other promotions. For example, publishers may direct promotional materials to various markets 1) ahead of a tour being planned by a performer to seed various markets to test the interest level by monitoring the response to the promotions, and/or 2) after a tour is announced, so as to raise interest in the customer base to buy the publisher materials and/or attend the live event.

Publishers may use the system 10 to identify promoters and other users that are interested in promoting the publishers' content. The publisher may provide promotional incentive for users involved in live events with performers that have content published by the publisher.

The publisher also may use the system 10 to view planned live events involving performers with content published by publisher, e.g., all concert by artists on a record label. The publisher may direct promotional materials to stakeholders involved with the live events.

In other instances, the publisher, or other user, may review content playback data to identify productive and unproductive markets, channels, etc. and take measures to improve the publisher's performance in those markets.

Channels may be able to share the promotion allocations at will by clicking or "linking" to each other for specific tour and artist promotion dates in the same fashion a promoter shares that show on the system 10 with an agent or label. The system 10 may display promotion allocations so that the manager, the promoter, the agent may share in this information privately with each respective channel, e.g., radio station, digital streamer, etc. The channels may also request promotional materials from the various stakeholders, contact performers about performances, etc.

In practice, the system 10 may be used in various ways to enable was wide array of activities surrounding the planning and execution of live events. Some exemplary actions will be described below, which are not intended to limit the scope of the invention in any way, but to further illustrate it.

Figure 2:
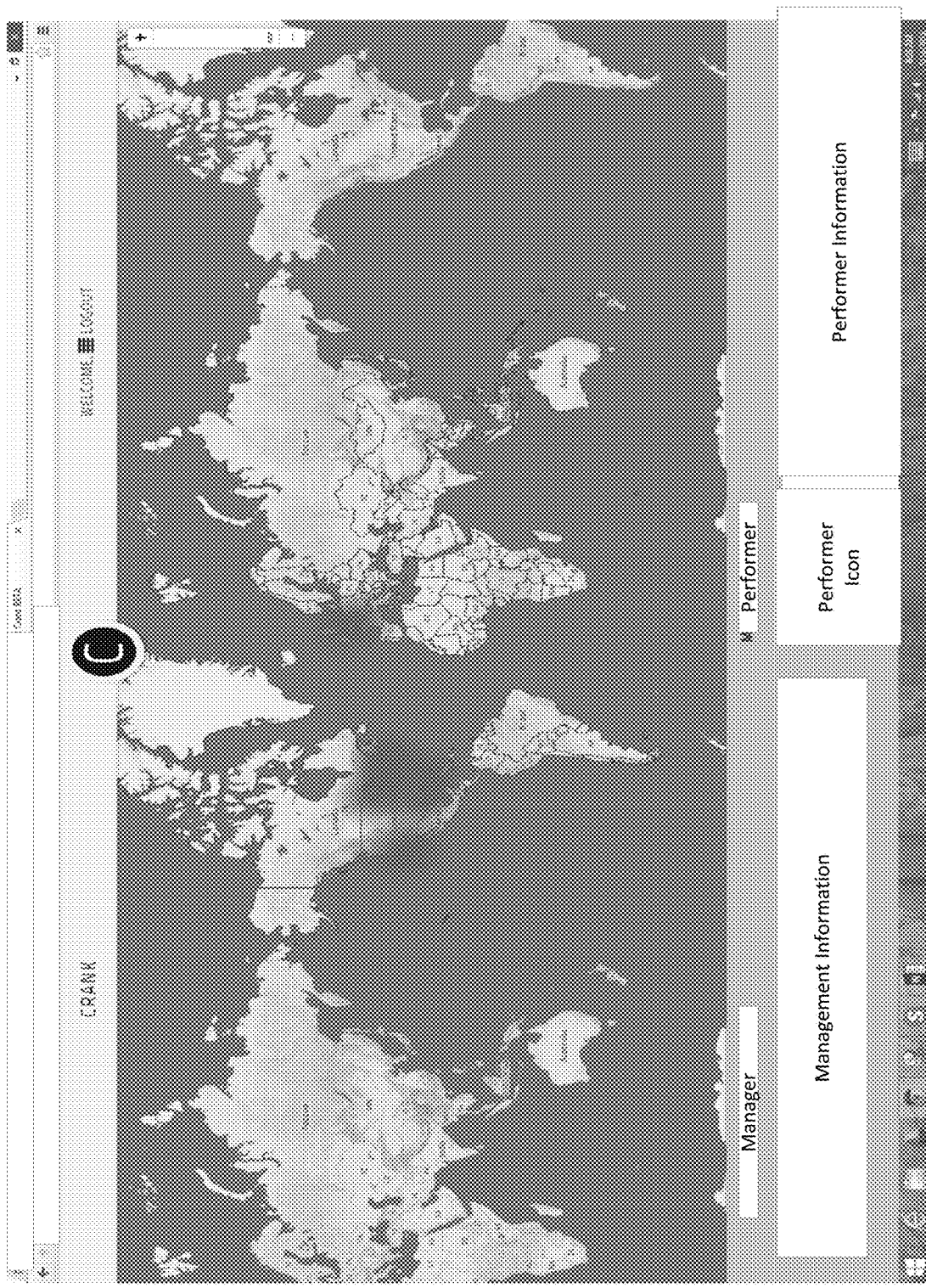
FIG. 2 illustrates an exemplary heat map depicting data.

FIG. 2 shows an exemplary heat map display of the system 10 in which the system 10 aggregates various data sources and presents the information on a map. For example, the system 10 may access playback data collected by the system 10 or externally by a third party data source, such as Mediabase, www.mediabase.com, a music industry service that monitors radio station airplay in approximately 180 US and Canadian markets, and display the airplay data for a given artist in each market as a heat map. A user may want to zoom in or out on the data being presented on the map, which may be performed in various known manners, such as clicking, highlighting, drawing, +/−buttons, etc.

When zooming in and out on the map, the system 10 may provide additional granularity on the map, such as displaying the playback as a function of the channel in a coverage area. It will be appreciated that different channels will have different coverage areas. Over the air broadcast channels will have a generally continuous bounded coverage areas. Internet broadcast and digital streaming channels may be generally available in an area, but the data may be sufficiently granular as to be discontinuous over the area.

Figure 3:
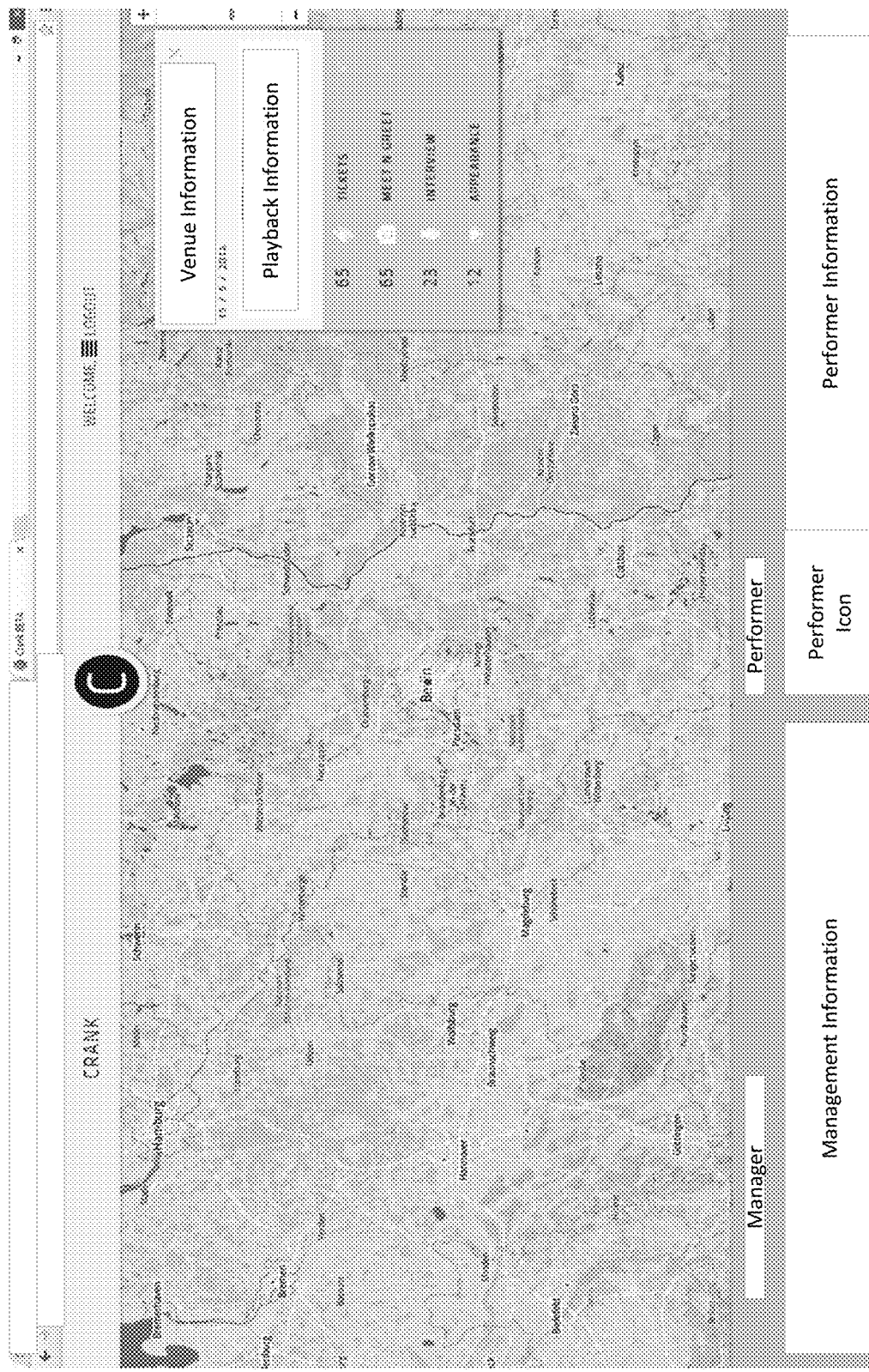
FIG. 3 illustrates an exemplary zoom-in on the map of FIG. 2.

FIG. 3 depicts a zoom in on FIG. 2, in which concert ticket promotion information is presented for concerts within the zoom in area, as well as channels within the area. In various embodiments, the data presented/displayed by the system 10 may be varied according to default and user preference settings. This information may be useful to performers that are interested in their promotion schedule, as well as to promoter looking to allocate promotions to this particular event. The user may choose to zoom in further on an area or more choose to zoom in on the additional data presented at that zoom in level. For example, a user may choose to zoom in one of the channels displayed as serving the area shown in the map. By zooming in on the channel, playback information for the performer may be presented along with active promotions for the concert with that channel.

Continuing the example of FIGS. 2 & 3, the user may instead choose to zoom in on the venue to review various details associated with the venue itself, e.g., number of seats, deposit, availability, etc., or details associated with planned live events at the venue. The amount of data presented to the user may be set by access levels in the system 10. For example, a promoter user may be given access only to detailed live event information for which they are the promoter.

Figure 5:
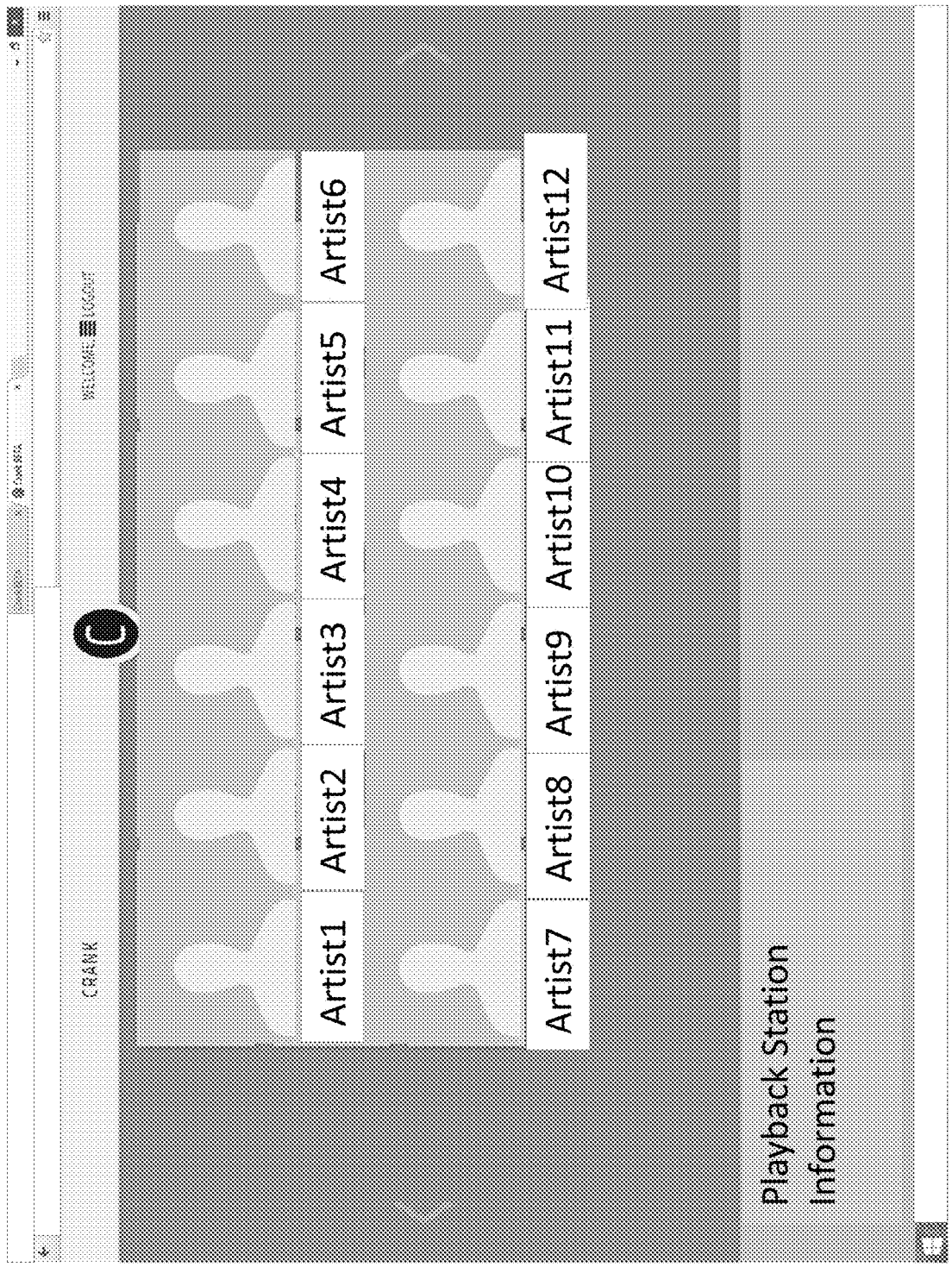
FIG. 5 illustrates an exemplary data display for a channel, e.g. radio station, of concerts being promoted or search results for a channel or location.

FIG. 5 depicts a similar scenario for a channel, e.g., radio station or other user. Upon logging into the system 10 or performing a search, the user may be presented with all of the concerts scheduled for their market along with promotional information, etc. The user may drill into a specific event to review event details, work on the promotion and logistics, etc.

It will be appreciated that most, perhaps all, data accessible by the system 10 may be displayed in heat or other map form, tabular, and combinations of graphical and textual form. For example, performers may review a heat map of promoter activity to identify active promoters in an area, planned concerts as a heat map to review live event frequency, channel playback information by market, etc.

Figure 4:
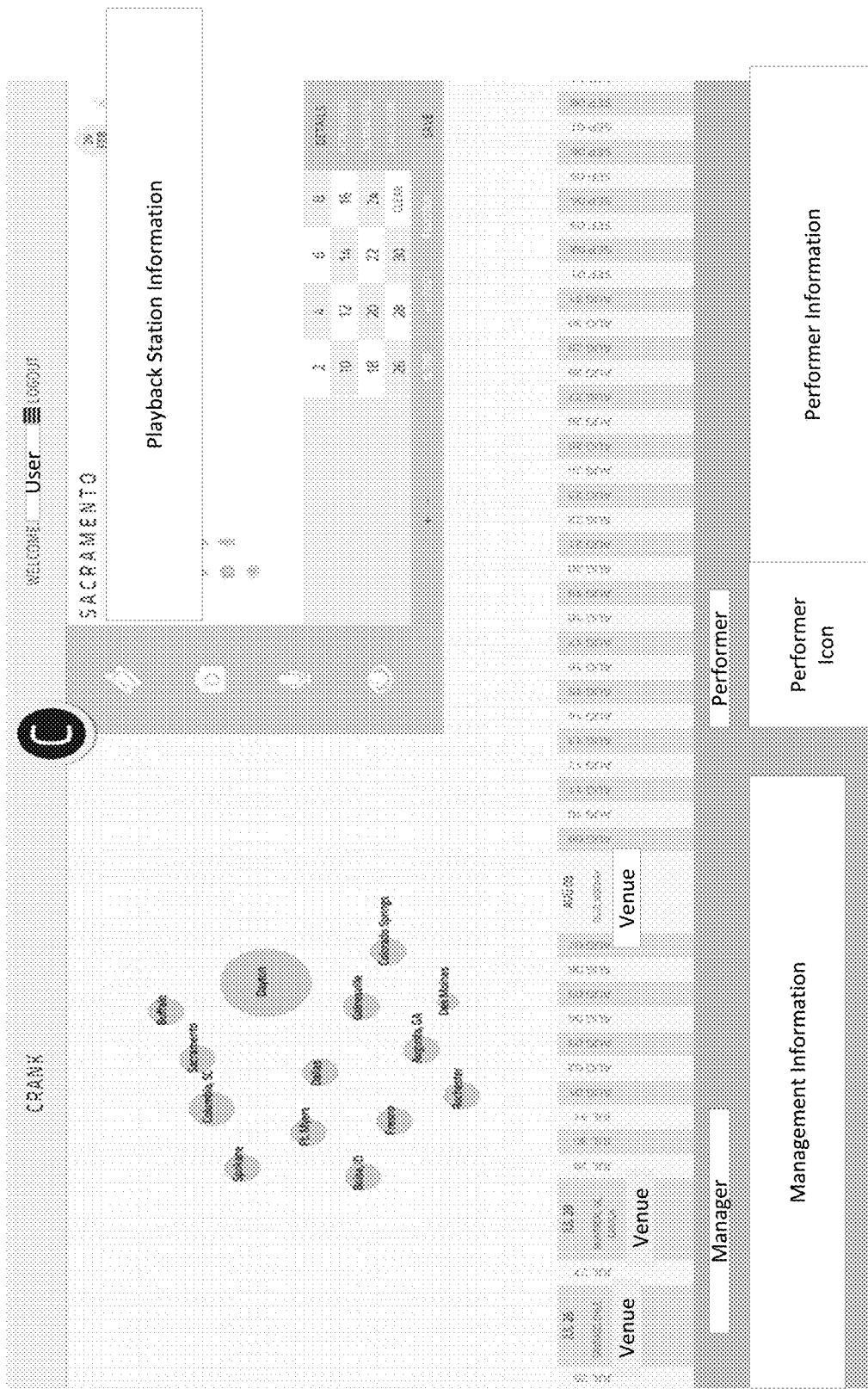
FIG. 4 illustrates a bubble graphic and table displaying data as numbers and icons.

FIG. 4 shows an example of how playback information, content sales, ticket sales, concert dates, etc. may be displayed in bubble chart form with the size of the bubbles reflecting various data on a location by location basis. Clicking on a location may provide the performer, promoter, etc. with various types of data, such as meet and greet commitments in the location as a function of channels serving that location, ticket sales, playback information, etc.

In various embodiments, all users of the system 10 may be provided with the same view of data at a first level. However, the view of the data may be varied depending upon one or more user attributes, such as the specific user, user type, etc. For example, a performer and promoter may be presented with promotional data concerning concerts in a zoomed in area, but that data would not be presented to a merchandiser or venue owner that zoomed in to the same area.

In various embodiments, information retrieved upon a query or login may be presented in tabular form. The information in the table may be linked to different information depending upon the access credentials of the user of the system 10. For example, a performer logging into their account may be presented in graphical and/or tabular form with their relevant data, such as tour dates, playback data, content sales, etc.

Figure 6:
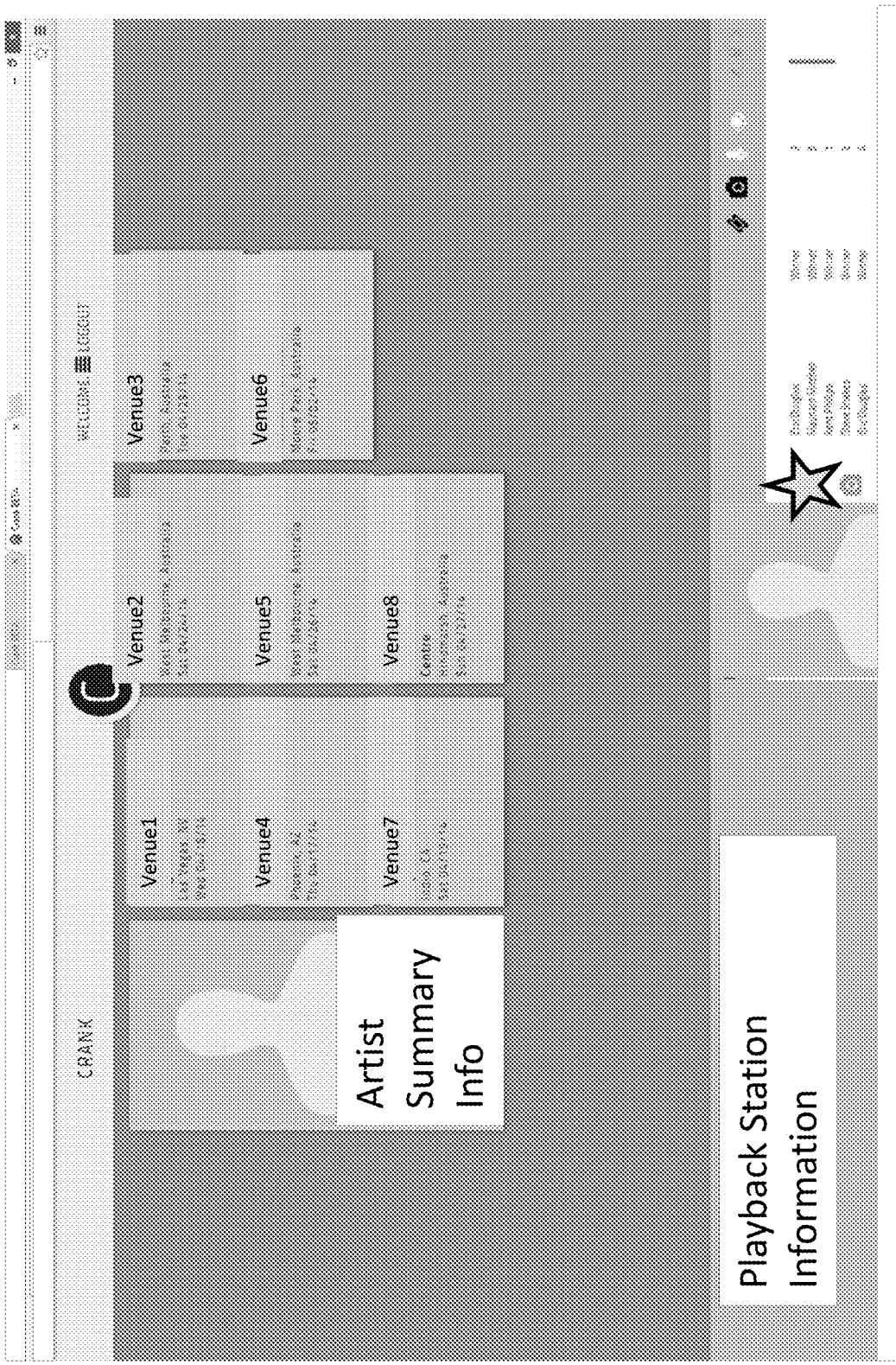
FIG. 6 illustrates an exemplary performer page showing performance, playback channels, etc.

FIG. 6 depicts an exemplary display presented to:
a performer upon login,
a live event attendee, i.e., fan, that performed a performer search,
a manager drilling into a performer client, etc.

When the performer drills into the data, they may be presented with information that is proprietary to them. For example, a performer drilling into a tour date may be displayed current promotional commitments, ticket sales information, guest lists, etc. Alternatively, the fan drilling into the same tour date may be presented information on the venue, date, time, and ticketing information. The other stakeholders may similarly be directed to information that is proprietary to their business and not available to some of the other stakeholders in the live event and users that are not stakeholders may be directed to public information about the event.

One of ordinary skill in the art will appreciate that the system 10 may be used in various manners to perform various task associated with the live event industry. For example, historical data analysis, predictive modeling, cause and effect analysis, etc. may be performed using the system 10, in addition to the operational planning and executing of live events.

Figure 7:
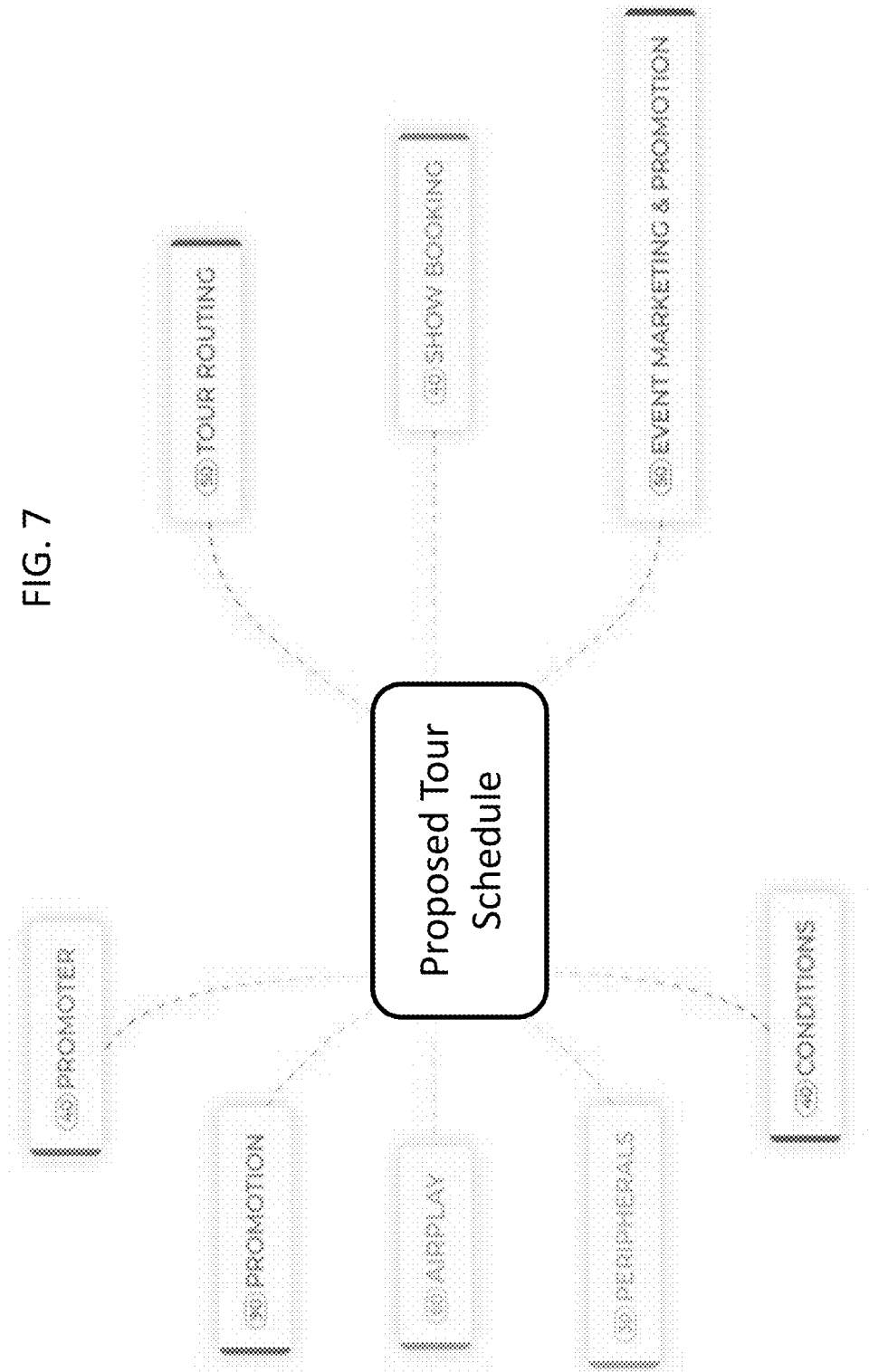
FIG. 7 illustrates various tour planning scenarios that may be analyzed by users of the system 10.

FIG. 7 illustrates various tour planning scenarios that may be analyzed by users of the system 10. As depicted in FIG. 1, the system 10 aggregates, stores, and analyzes data input from the various users 14 and other data sources 16 pertaining to the various factors that impact tour scheduling. The system 10 may use the data to may assign numerical weights to various factors, such as 1) promoters, 2) promotions, 3) airplay, 4) peripherals, 5) event conditions, 6) event marketing & promotion, 7) show booking, 8) tour routing, etc. The numerical weighting assigned to the various factors may be generated by the system 10 via analysis of the data input from the various sources that may be curated by system administrators and various consultants. The proposed tour schedule that is generated may vary depending upon the relative weights associated with the various factors.

Various factors contributing to the promoter rating include advertising and budget, strength of show lineup, venue type, size, & location, historical ticket sales, proposed ticket prices and fees. Promotional factors include proposed timelines, show sponsor, social media and other press coverage, performer availability, promotional collateral. Airplay volumes via radio, streaming, song placement in ads on TV, etc., content release schedule, genre popularity in the market. Peripheral factors include drink prices, age restrictions, parking, public transportation, proximity to other activities, etc. Event conditions include the weather, day of the week, time of the show, other events, frequency of appearance by the performer and other similar performers. The skilled artisan may be able to include additional factors and vary the weighting to meet the needs of the user.

Figure 8:
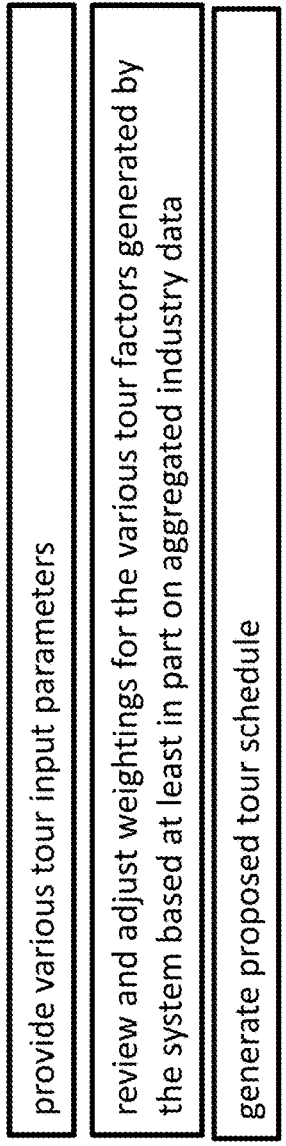
FIG. 8 illustrates various embodiments of methods for users to employ the system 10 for tour planning.

FIG. 8 illustrates various embodiments of methods for users to employ the system 10 for tour planning. The user of the system 10, such as a performer or their delegate, e.g., manager, may provide to the system, via software running on one or more processors, various tour input parameters, such as date range, number of tour stops, shows per week, preferred days, geographic regions, desired or required cities, etc. The user may review the numerical weightings for the various tour factors generated by the system 10 and may make adjustments that may be particular to the specific user and/or may represent additional data being input into the system 10 relevant to those factors. For example, FIG. 7 depicts various factors with numerical weightings assigned to the factors, which may be generated by the system 10 based on the data and may be adjusted by the user. For example, a performer may use the default weightings generated by the system 10 for all factors, except the performer may modify a weighting assigned to an otherwise high rated promoter with whom the performer had a prior dispute. This modification of the industry data for this performer may impact the proposed tour schedule generated by the system 10. While a user of the system 10 may want to adjust various weightings assigned to the various tour factors, it will be appreciated that the aggregation of event data from the various stakeholders and data sources in many cases represents collective industry knowledge backed by data. As such, it may often be advantageous for individual user to limit adjust to individually specific exceptions to weightings based on aggregated industry knowledge. That being said users may collaborate with other users, including system administrators, to address other tour factors and the treatment of data by the system 10, if the aggregated data appears to be inconsistent with the users' perception of the industry knowledge relative to those factors.

The numerical weights may be used to score and rank the various combinations of cities, venues, etc. The system 10 may generate a proposed tour schedule based on the user tour input parameters and tour factor weightings. The system 10 may provide a city ranking that may be used by the user to refine the tour input parameters and generate a refined schedule. The proposed tour schedule may be used by the user to create various entities as discussed herein to request various stakeholders at each proposed tour stop to provide quotes and execute contracts for the various facilities and services required for the performance based on conditions set forth in the entities and other negotiated.

The system 10 may allow relevant stakeholder users to orchestrate promotional campaigns through the various views, such as those shown in FIGS. 2-6. A promotion entity containing promotional materials may be defined in the system 10. The promotion entity may be manually and/or automatically delivered to various stakeholders involved with the live event. For example, a performer or promoter user of the system 10 may define a promotion in the system 10 involving promotional materials controlled by the user, e.g., a promoter defines a promotion involving concert ticket giveaways. The user then delivers in the system 10 that promotion to one or more stakeholder. The system 10 may deliver the promotion in various ways, such as sending emails and texts to recipients and/or placing the promotion a system inbox or account of the recipient.

In various embodiments, a promotional entity may be depicted by the system 10 as a promotional icon that has attributes including the promotional material. A user's promotional icons may be displayed by the system 10 on a dashboard that allows the user to drag and drop the promotional icon onto a user icon or space of the intended recipient(s). Upon dropping the promotional icon, the user's and recipient's account would reflect delivery of the promotional material. One of skill in the art will recognize that other ways to identify and deliver the promotional material to one or more recipients may be employed.

As shown in FIGS. 2-6, user icons may be defined for some or all of the various users and/or interested parties that have been entered into the system. The user icons may include location information for user that location based e.g., radio/TV stations, venues, etc., which may be used to display the user icon on various maps displayed by the system 10.

In addition, a user may identify a promotion for a pool of recipients, called a pool promotion. The pool promotion places the promotional material in a pool and notifies recipients of their eligibility for the promotional materials and how that promotional material may be claimed from the pool by the recipient or their customers. The pool promotion may allocate the promotional material in various manners as desired by the user providing the promotion. For example, tickets may be released upon the satisfaction of one or more conditions, on a first come, first served basis, etc.

Figure 9:
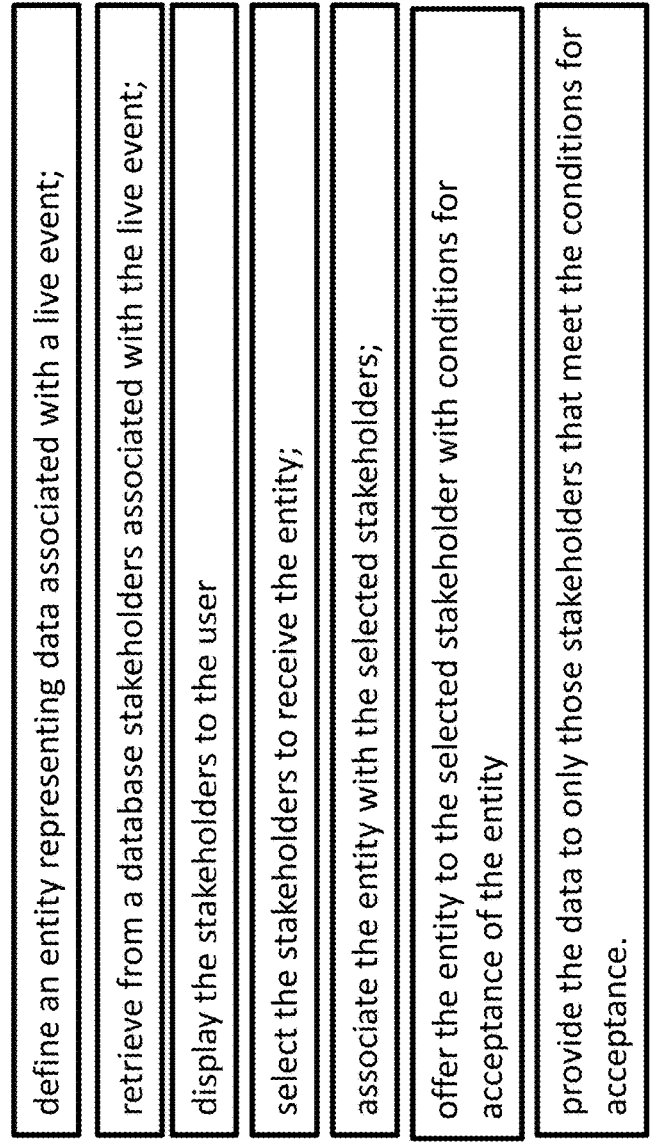
FIG. 9 depicts various exemplary methods of providing promotional material and other data via entities in the system 10.

FIG. 9 depicts various exemplary methods of providing promotional material and other data via entities in the system 10, such as by running software embodying the methods on one or more processors and interacting with various database containing data relevant to the live events.

A user of the system 10 may define an entity representing data associated with a live event. The data may include various types of promotional material, such as free tickets, in-person and interview commitments; solicitation for bids for venues, vendor services, other performers, etc. The system 10, via the processors, may retrieve from the database various stakeholders associated with the live event and display the stakeholders to the user from which the user may select stakeholders to receive the entity. The system 10 may then associate the entity with the selected stakeholders and offer the entity to the selected stakeholder with conditions for acceptance of the entity. For example, the conditions may include various air time or interview commitments, venue and service contracts, etc. The system 10 may then provide the data to only those stakeholders that meet the conditions for acceptance.

It will be appreciated that in some instances, as with contracts, the only one stakeholder may receive the commitment from the user. In other instances, such as with promotional pools, the entity may be available for acceptance by any stakeholder meeting the conditions for acceptance.

For various stakeholders, e.g., booking agencies, promoters, etc., the system 10 may be used to match available performers, venues, and dates, and issue proposals to the various stakeholders for scheduling a live event. For non-stakeholders, including fans, the system 10 may be queried to find events to attend or that may require services. As such, the system 10 may be configured as an open platform to enable users of the system to provide access to non-users of the system for specific events. For example, a non-user may be looped into a show to assist with the promotion of a show, such as by hosting a meet and greet, and then access is either automatically removed after the event or the non-user is offered an opportunity to become a user by purchasing a subscription or otherwise. In addition, the system 10 may also be used to provide access rights to industry groups, e.g., non-profit industry advocacy groups such as IFPI, A2IM, and NARAS, that might use data in the system to support the industry.

The system 10 may be further used by performer to obtain commitments to purchase from attendees, as stakeholder, as a way to decide performance locations. The commitment to purchase may involve a non-refundable portion and/or a special bonus of some form. The system 10 may also enable event attendees to make requests and/or vote for songs on the setlist, pre-order a recording of the concert, etc.

It will be appreciated that the system 10 may include various components, e.g., servers, processors, storage, etc., and access data and databases that may be owned or controlled by one or more different entities, e.g., Mediabase, Amazon Web Services, etc. Access to the various databases and the types of information yielded may depend upon the cooperation of multiple unrelated entities. As such, it is desirable that the interaction with the system 10 may provide a mutual benefit to any data source, as well as stakeholders and other users of the system 10.

Figure 10:
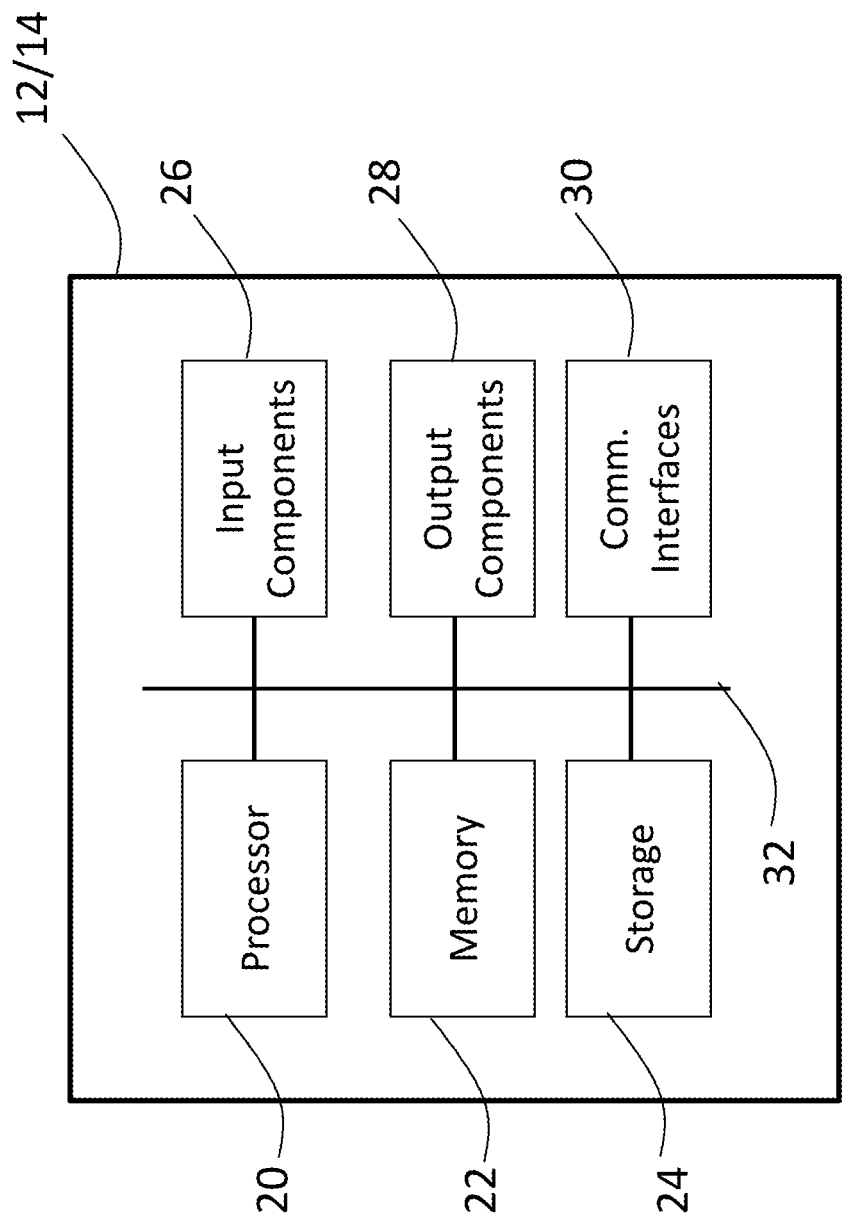
FIG. 10 illustrates an exemplary components in various computing resources of the system.

FIG. 10 illustrates exemplary component embodiments that may be employed in the management platform 12, users and user devices 141-N, and external data sources ("computing resources") interacting with the system 10. The computing resources may each include one or more processors 20, memory 22, storage 24, input components 26, output components 28, communication interfaces 30, as well as other components that may be interconnected as desired by the skilled artisan via one or more buses 32.

Processor(s) 20 may include one or more general or Central Processing Units ("CPU"), Graphics Processing Units ("GPU"), Accelerated Processing Units ("APU"), microprocessors, and/or any processing components, such as a Field-Programmable Gate Arrays ("FPGA"), Application-Specific Integrated Circuits ("ASIC"), etc. that interpret and/or execute logical functions. The processors 20 may contain cache memory units for temporary local storage of instructions, data, or computer addresses and may be implemented as a single-chip, multiple chips and/or other electrical components including one or more integrated circuits and printed circuit boards that implements and executes logic in hardware, in addition to executing software.

Processor(s) 20 may connect to other computer systems and/or to telecommunications networks as part of performing one or more steps of one or more processes described or illustrated herein, according to particular needs. Moreover, one or more steps of one or more processes described or illustrated herein may execute solely at the processor 20. In addition, or as an alternative, one or more steps of one or more processes described or illustrated herein for execution in one processor may be executed at multiple CPUs that are local or remote from each other across one or more networks.

The computing resources of the system 10 may implement processes employing hardware and/or software to provide functionality via hardwired logic or otherwise embodied in circuits, such as integrated circuits, which may operate in place of or together with software to execute one or more processes or one or more steps of one or more processes described or illustrated herein. Software implementing particular embodiments may be written in any suitable programming language (e.g., procedural, object oriented, etc.) or combination of programming languages, where appropriate.

Memory 22 may include Random Access Memory ("RAM"), Read Only Memory ("ROM"), and/or another type of dynamic or static storage device, such as flash, magnetic, and optical memory, etc. that stores information and/or instructions for use by processor 20. The memory 22 may include one or more memory cards that may be loaded on a temporary or permanent basis. Memory 22 and storage 24 may include a Subscriber Identification Module ("SIM") card and reader.

Storage components 24 may store information, instructions, and/or software related to the operation of the system 10 and computing resources in various databases and other formats. Storage 24 may be used to store operating system, executables, data, applications, and the like, and may include fast access primary storage, as well as slower access secondary storage, which may be virtual or fixed.

Storage component(s) 24 may include one or more transitory and/or non-transitory computer-readable media that store or otherwise embody software implementing particular embodiments. The computer-readable medium may be any tangible medium capable of carrying, communicating, containing, holding, maintaining, propagating, retaining, storing, transmitting, transporting, or otherwise embodying software, where appropriate, including nano-scale medium.

The computer-readable medium may be a biological, chemical, electronic, electromagnetic, infrared, magnetic, optical, quantum, or other suitable medium or a combination of two or more such media, where appropriate. Example computer-readable media include, but are not limited to fixed and removable drives, ASIC, Compact Disks ("CDs"), Digital Video Disks ("DVDs", FPGAs, floppy disks, optical and magneto-optic disks, hard disks, holographic storage devices, magnetic tape, caches, Programmable Logic Devices ("PLDs"), RAM devices, ROM devices, semiconductor memory devices, solid state drives, cartridges, and other suitable computer-readable media.

Input components 26 and output components 28 may include various types of Input/Output ("I/O") devices, user interfaces ("UI") and application programming interfaces ("API"). The I/O devices often may include a Graphical User Interface ("GUI") that provides an easy to use visual interface between the user and system 10 and access to the operating system or application(s) running on the devices.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

Input components 26 receive any type of input in various forms from users or other machines, such as touch screen and video displays, keyboards, keypads, mice, buttons, track balls, switches, joy sticks, directional pads, microphones, cameras, transducers, card readers, voice and handwriting inputs, and sensors for sensing information such as biometrics, temperature & other environmental conditions, such as air quality, etc., location via Global Positioning System ("GPS") or otherwise, accelerometer, gyroscope, actuator data, which may be input via a component in the user device 12 and/or received via one or more communication interfaces 30.

Output component 28 may include displays, speakers, lights, sensor information, mechanical, or other electromagnetic output. Similar to the input, the output may be provided via one or more ports and/or one or more communication interfaces 30.

Communication interface 30 may include one or more transceivers, receivers, transmitters, modulators, demodulators that enable communication with other devices, via wired and/or wireless connections. Communication interface 30 may include Ethernet, optical, coaxial, Universal Serial Bus ("USB"), Infrared ("IR"), Radio Frequency ("RF") including the various Wi-Fi, WiMax, cellular, and Bluetooth protocols, such as Bluetooth, Bluetooth Low Energy (BLE), Wi-Fi (IEEE 802.11), Wi-Fi Direct, Super-WiFi, 802.15.4, WiMax, LTE systems, LTE Direct, past, current, and future cellular standard protocols, e.g., 4-5G, or other wireless signal protocols or technologies as described herein and known in the art.

Bus(es) 32 may connect a wide variety of other subsystems, in addition to those depicted, and may include various other components that permit communication among the components in the computing resources. The bus(es) 32 may encompass one or more digital signal lines serving a common function, where appropriate, and various structures including memory, peripheral, or local buses using a variety of bus architectures. As an example and not by way of limitation, such architectures include an Industry Standard Architecture ("ISA") bus, an Enhanced ISA ("EISA") bus, a Micro Channel Architecture ("MCA") bus, a Video Electronics Standards Association Local Bus ("VLB"), a Peripheral Component Interconnect ("PCI") bus, a PCI-eXtended ("PCI-X") bus, a Peripheral Component Interconnect Express (PCIe) bus, a Controller Area Network ("CAN") bus, and an Accelerated Graphics Port ("AGP") bus.

The computing resources of the system 10 may provide functionality as a result of the processors 20 executing software embodied in one or more computer-readable storage media residing in the memory 22 and/or storage 24 and logic implemented and executed in hardware. The results of executing the software and logic may be stored in the memory 22 and/or storage 24, provided to output components 28, and transmitted to other devices via communication interfaces 30. In execution, the processor 20 may use various inputs received from the input components 26 and/or the communications interfaces 30. The input may be provided directly to the processor 20 via the bus 32 and/or stored before being provided to the processor 20. Executing software may involve carrying out processes or steps may include defining data structures stored in memory 22 and modifying the data structures as directed by the software.

The foregoing disclosure provides examples, illustrations and descriptions of the present invention, but is not intended to be exhaustive or to limit the implementations to the precise form disclosed. Modifications and variations are possible in light of the above disclosure or may be acquired from practice of the implementations. These and other variations and modifications of the present invention are possible and contemplated, and it is intended that the foregoing specification and the following claims cover such modifications and variations.

As used herein, the term component is intended to be broadly construed as hardware, firmware, and/or a combination of hardware and software. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The presence or absence of a summary, abstract, or claims in this application should in no way be considered as limiting on the scope of any inventions disclosed herein.

What is claimed is:

1. A method of managing live events comprising:
   defining, by a processor and via a user, an entity representing data associated with a live event;
   retrieving, by the processor from a database, stakeholders associated with the live event;
   displaying, by the processor to the user, the stakeholders;
   selecting, by the user via the processor, the stakeholders to receive the entity;
   associating, by the processor, the entity with the selected stakeholders;
   offering, by the processor, the entity to the selected stakeholder with conditions for acceptance of the entity; and
   providing, by the processor, the data to only those stakeholders that meet the conditions for acceptance, where
      selecting includes selecting a plurality of channels to offer the entity as a promotional entity including promotional materials, and
      offering includes offering the plurality of channels the promotional entity as a promotional pool, where
   defining includes defining the entity as an icon linked to the information, and
   displaying includes displaying the icon, and
   selecting includes
      dragging the icon on the display; and
      dropping the icon on the stakeholders.

2. The method of claim 1, where:
   the data include promotional material including at least one of event tickets and personal appearances; and
   the conditions include airplay and ticket sales requirements.

3. The method of claim 1, where:
   the data include at least one of promotional and event services; and
   the conditions include at least one of price for the service and service provider ratings.

4. The method of claim 1, where:
   the data include venues to host the live event; and
   the conditions include at least one of price to host the event and venue capacity.

5. The method of claim 1, further comprising:
   modifying the entity by changing the information included in the entity; and
   notifying the stakeholders of the modified entity.

6. The method of claim 1, where:
   the stakeholders include at least one of venue operators, promoters, content providers, and event service providers.

7. The method of claim 1, further comprising:
   rescinding the offering of the entity from stakeholders that did not meet the conditions for acceptance.

8. The method of claim 1, where offering includes offering the entity in the promotional pool for acceptance by the stakeholders.

9. The method of claim 1, where the stakeholders are allowed to view various data according to user access levels assigned to the stakeholder.

10. A method of managing live events comprising:
    defining, by a processor and via a user, an entity representing data associated with a live event;
    retrieving, by the processor from a database, stakeholders associated with the live event;
    displaying, by the processor to the user, the stakeholders;
    selecting, by the user via the processor, the stakeholders to receive the entity;
    associating, by the processor, the entity with the selected stakeholders;
    offering, by the processor, the entity to the selected stakeholder with conditions for acceptance of the entity;
    providing, by the processor, the data to only those stakeholders that meet the conditions for acceptance, where
       selecting includes selecting a plurality of channels to offer the entity as a promotional entity including promotional materials, and
       offering includes offering the plurality of channels the promotional entity as a promotional pool;
    receiving, from at least one of the stakeholders and by the processor, a first live event data display request for the live event;
    displaying, by the processor, the first live event data;
    zooming in, by the user via the processor, on the first live event data; and
    displaying, by the processor, a portion of the first live event data in a zoomed in area and second live event data associated with the zoomed in area, where
    the second live event data displayed being a function of user permissions, and
    the user permissions being different for various stakeholders.

11. The method of claim 10, where
    defining includes defining the entity as an icon linked to the information; and,
    displaying includes displaying the icon; and,
    selecting includes
       dragging the icon on the display; and
       dropping the icon on the stakeholders.

12. The method of claim 10, where
    the first live event data is displayed on a map, and
    the second live event data is displayed in text form.

13. The method of claim 10, where
    the first live event data includes at least one of content playback, content sales, and performance dates as a function of geographic area; and
    the second live event data includes live events and at least one of channels, venues, promoters, and promotional material relevant to the zoomed in areas.

14. A method of managing live events comprising:
    logging into a system, by a processor, as a user;
    displaying, by the processor, live events in which the user is a stakeholder;
    selecting, by the user via the processor, a live event from the displayed live events;
    displaying, by the processor, live event data pertaining to the selected live event;
    creating, by the user via the processor, an entity including data related to the live event;

associating, by the user via the processor, the entity with other stakeholders in the data for the selected live event; and, offering, by the processor, the entity to the other stakeholders with conditions for acceptance of the entity; and providing, by the processor, the data to only those stakeholders that meet the conditions for acceptance, where
creating includes creating the entity as a promotional entity including promotional materials,
associating includes associating the entity with a plurality of channels, and
offering includes offering the plurality of channels the promotional entity as a promotional pool, receiving, from at least one the stakeholders and by the processor, a first live event data display request for the live event;

displaying, by the processor, the first live event data;

zooming in, by the user via the processor, on the first live event data; and displaying, by the processor, a portion of the first live event data in a zoomed in area and second live event data associated with the zoomed in area, where
the second live event data displayed being a function of user permissions, and
the user permissions being different for various stakeholders.

15. The method of claim 14, further comprising:
sharing, via the processor, the entity by the user with another stakeholder.

16. The method of claim 1, where the data is stored in a database communicating with the processor.

17. The method of claim 14, where the data is stored in a database communicating with the processor.

18. The method of claim 14, where:
the data include promotional material including at least one of event tickets and personal appearances; and
the conditions include airplay and ticket sales requirements.

19. A non-transitory computer readable medium storing instructions, the instructions comprising:
one or more instructions which, when executed by one or more processors, cause the one or more processors to implement the method of claim 1.

20. A non-transitory computer readable medium storing instructions, the instructions comprising:
one or more instructions which, when executed by one or more processors, cause the one or more processors to implement the method of claim 14.

* * * * *